(12) United States Patent
Smith

(10) Patent No.: US 11,732,178 B2
(45) Date of Patent: Aug. 22, 2023

(54) METHOD FOR ENGINEERED GEOTHERMAL SYSTEM IN-SITU CONFORMANCE IMPROVEMENT TREATMENT USING BRINES INFUSED WITH CO2

(71) Applicant: Thomas B. Smith, Littleton, CO (US)

(72) Inventor: Thomas B. Smith, Littleton, CO (US)

( * ) Notice: Subject to any disclaimer, the term of this patent is extended or adjusted under 35 U.S.C. 154(b) by 0 days.

(21) Appl. No.: 17/881,551

(22) Filed: Aug. 4, 2022

(65) Prior Publication Data

US 2023/0041084 A1 Feb. 9, 2023

Related U.S. Application Data

(60) Provisional application No. 63/229,402, filed on Aug. 4, 2021.

(51) Int. Cl.
| | | |
|---|---|---|
| *C09K 8/504* | (2006.01) | |
| *C09K 8/66* | (2006.01) | |
| *E21B 43/26* | (2006.01) | |
| *C09K 8/74* | (2006.01) | |
| *C09K 109/00* | (2006.01) | |

(52) U.S. Cl.
CPC ............ *C09K 8/5045* (2013.01); *C09K 8/665* (2013.01); *C09K 8/74* (2013.01); *E21B 43/26* (2013.01); *C09K 2109/00* (2013.01); *C09K 2208/12* (2013.01)

(58) Field of Classification Search
None
See application file for complete search history.

(56) References Cited

U.S. PATENT DOCUMENTS

| | | | | | |
|---|---|---|---|---|---|
| 1,290,554 | A | * | 1/1919 | D'Errico | ............... A01K 13/002 15/246 |
| 2,793,187 | A | * | 5/1957 | Fischer | .................... C09K 8/32 507/135 |
| 2,947,690 | A | * | 8/1960 | Axelrad | ................... E21B 36/00 299/6 |
| 3,024,612 | A | * | 3/1962 | Ludeman | ................. B65G 5/00 299/5 |
| 3,651,868 | A | * | 3/1972 | Caudle | .................... C09K 8/528 134/28 |

(Continued)

FOREIGN PATENT DOCUMENTS

| | | |
|---|---|---|
| CN | 107035350 B | 3/2019 |
| MX | 2011003494 A | 7/2011 |

(Continued)

OTHER PUBLICATIONS

"International Search Report and Written Opinion of the International Searching Authority," issued in connection with Int'l Appl. No. PCT/US22/39486, dated Oct. 26, 2022 (9 pages).

(Continued)

*Primary Examiner* — John J Figueroa
(74) *Attorney, Agent, or Firm* — Holland & Hart LLP

(57) ABSTRACT

A method of repairing a well is provided. The method includes injecting a brine solution into the well, injecting carbon dioxide into the well, and reacting the brine solution in the reservoir rock with the carbon dioxide to form calcite such that calcite precipitates into the desired flow path between a cold well and a hot well to effectively repair short circuits within the EGS reservoir.

11 Claims, 4 Drawing Sheets

(56) References Cited

U.S. PATENT DOCUMENTS

| | | | | |
|---|---|---|---|---|
| 3,902,556 | A | * | 9/1975 | Tate ................. C09K 8/584 |
| | | | | 166/400 |
| 3,916,994 | A | * | 11/1975 | Maddox, Jr. ........ C09K 8/584 |
| | | | | 507/933 |
| 3,916,996 | A | * | 11/1975 | Shupe ................. C09K 8/62 |
| | | | | 507/933 |
| 3,921,716 | A | * | 11/1975 | Tate ................. C09K 8/594 |
| | | | | 166/402 |
| 4,844,164 | A | * | 7/1989 | Shen ................. C09K 8/42 |
| | | | | 166/291 |
| 5,035,813 | A | * | 7/1991 | Shen ................. E21B 33/14 |
| | | | | 423/230 |
| 8,091,639 | B2 | | 1/2012 | Rose et al. |
| 8,272,437 | B2 | | 9/2012 | Bour et al. |
| 2014/0148366 | A1 | | 5/2014 | Reyes et al. |
| 2015/0192002 | A1 | * | 7/2015 | Rogers ............... E21B 43/34 |
| | | | | 166/272.2 |
| 2020/0131887 | A1 | * | 4/2020 | Collins ............... E21B 33/138 |

FOREIGN PATENT DOCUMENTS

| | | |
|---|---|---|
| WO | 2017/098256 A1 | 6/2017 |
| WO | 2017/173329 A1 | 10/2017 |

OTHER PUBLICATIONS

Aqui, A. R., et al., "Permeability Enhancement of Conventional Geothermal Wells", New Zealand Geothermal Workshop 2011 Proceedings. Web, 2011, pp. 1-10.

Grimes, C. J., et al., "Calcium Carbonate Particle Formation through Precipitation in a Stagnant Bubble and a Bubble Column Reactor", Crystal Growth and Design. Web, vol. 20, No. 8, 2020, pp. 5572-5582.

Warren, "Calcium Chloride (CaCl2) Article 1 of 2: Usage and brine chemistry", www.saltworkconsultants.com., pp. 1-8.

* cited by examiner

METHOD FOR ENGINEERED GEOTHERMAL SYSTEM IN-SITU CONFORMANCE IMPROVEMENT TREATMENT USING BRINES INFUSED WITH CO2

CROSS REFERENCE TO RELATED APPLICATIONS

This application is related to and claims priority under 35 U.S.C. 119 from U.S. Provisional Application No. 63/229,402 filed Aug. 4, 2021, entitled "Apparatus and Method for Engineered Geothermal System in-Situ Conformance Improvement Treatment using Brines Infused with CO2 (In-Situ Conformance Improvement Treatment (ICIT))," the entire contents of which are fully incorporated by reference herein for all purposes.

BACKGROUND OF CERTAIN ASPECTS OF THE DISCLOSURE

At least some known subterranean technologies include drilling at least one well into the earth to extract minerals, oil, gas, and/or heat from the earth for use on the surface. For example, oil and gas extraction facilities typically include at least one well that has been drilled into the earth to free and extract the oil and gas from the ground. Additionally, engineered geothermal systems (EGS) typically include two wells drilled into the earth as a pair, one a cold well and the second a complimentary hot well. A heat transfer fluid is pumped into the cold well and extracted from the hot well. The heat transfer fluid absorbs heat from the earth and the heat is used to generate power on the surface. The wells are typically drilled into the earth using surface drills and later completed using fracturing techniques that may crack or fracture the rock to create an engineered geothermal reservoir in otherwise unsuitable rock conditions.

However, during the fracking process, the resultant condition of the rock may cause unexpected damage to the earth proximate the well and within the engineered geothermal reservoir. For example, the cold and hot wells of the EGS are typically located proximate each other and unexcepted fracturing of the rock may cause highly fluid transmissive fissures or short circuits to form between the cold and hot wells. The short circuit would cut the path of the heat transfer fluid short, reducing the area of contact between the heat transfer fluid and the earth and reducing the amount of heat the heat transfer fluid can absorb from the earth. Accordingly, there is a need for a system that is capable of plugging undesirable fractures in wells to improve the overall viability of the wells and the EGS Project.

BRIEF SUMMARY OF SOME ASPECTS OF THE DISCLOSURE

A number of embodiments of a method of repairing a well, a method for preparing a brine solution, a method for removing heat from rock within a well using a brine solution for EGS, and a method of fracturing a well are presented in this application. The embodiments described herein include a method of repairing a well. The method includes injecting a brine solution into the well, injecting carbon dioxide into the well, and reacting the brine solution with the carbon dioxide to form calcite such that calcite precipitates into the well and repairs undesirable fissures or short circuits in the geothermally hot reservoir rock in contact with fluids injected for heat recovery via the cold well.

The embodiments described herein also include a method of preparing a brine solution. The method includes providing a calcium brine solution including calcium chloride and at least one reaction inhibitor. The method also includes adjusting a concentration of at least one reaction inhibitor within the calcium brine solution.

The embodiments described herein also include a method of removing heat from rock within a well. The method includes drilling at least one well for an EGS. The method further includes injecting a brine solution into the well. The method also includes transferring geothermal heat from the rock to the brine solution.

The embodiments described herein also include a method of fracturing a well. The method includes drilling at least one well and super-cooling a brine solution. The method further includes injecting the brine solution into the well and transferring heat from the rock to the brine solution. The method also includes thermally contracting and fracturing the rock, creating a more conductive flow path for later injection of brine used for heat transfer purposes.

There are other novel aspects and features of this disclosure. They will become apparent as this specification proceeds. Accordingly, this brief summary is provided to introduce a selection of concepts in a simplified form that are further described below in the detailed description. The summary and the background are not intended to identify key concepts or essential aspects of the disclosed subject matter, nor should they be used to constrict or limit the scope of the claims. For example, the scope of the claims should not be limited based on whether the recited subject matter includes any or all aspects noted in the summary and/or addresses any of the issues noted in the background.

DRAWINGS

The preferred and other embodiments are disclosed in association with the accompanying drawings in which.

DETAILED DESCRIPTION

Figure 1:
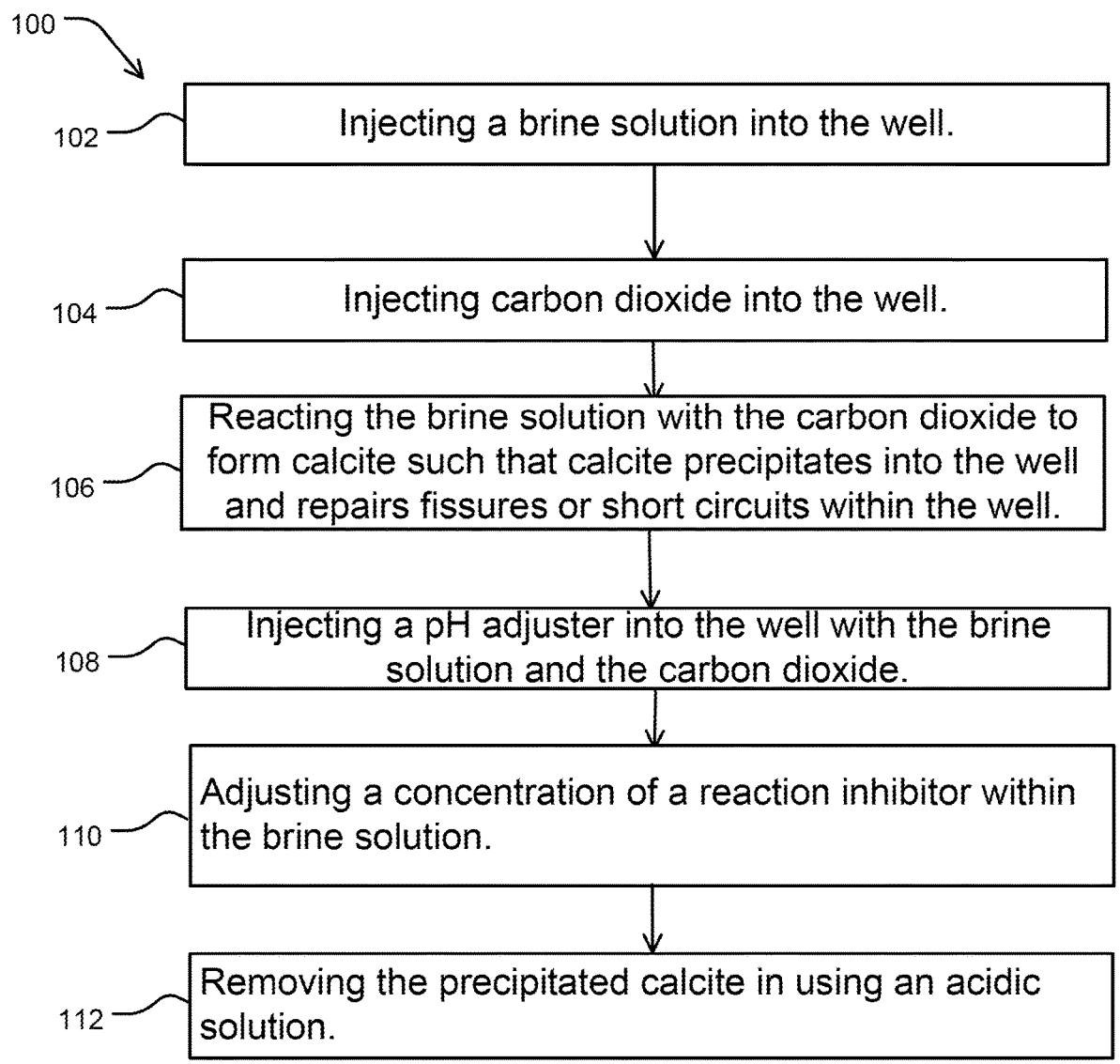
FIG. 1 illustrates a flow diagram of a method of repairing a well in accordance with aspects of the present disclosure.

A number of embodiments of a method of repairing a well, a method for preparing a brine solution, a method for removing heat from rock within a well using a brine solution for EGS, and a method of fracturing a well are presented in this application. In general, each of the methods described herein use a brine solution to repair a well, absorb heat from a well, and/or fracture the rock around a well. Specifically, in the illustrated embodiments, the brine solution includes a calcium brine solution. More specifically, in the illustrated embodiments, the brine solution includes a calcium rich brine solution. The calcium brine solution has several unique properties that enable the solution to repair and/or fracture wells and absorb heat from the geothermally hot reservoir rock in contact with brine pumped into a well.

Specifically, in some embodiments, the calcium brine solution may be injected into the well with liquid carbon dioxide ($CO_2$) and pH adjuster such that the calcium brine solution, the liquid carbon dioxide, and the pH adjuster react to precipitate calcite ($CaCO_3$) in the flow paths where the injected brine is flowing through the fractures in the hot reservoir outside the walls of the cold well casing on its path to the hot well. The calcite precipitates into undesired fissures or short circuits in the EGS reservoir's flow paths and plugs the undesired fissures or short circuits in the well. As such, the calcium brine solution may be used to improve an inefficient EGS project's heat recovery.

Additionally, in some embodiments, the calcium brine solution may have a high heat capacity and may be capable of absorbing large amounts of heat. As such, the calcium brine solutions described herein may be capable of absorbing greater amounts of heat than current EGS fluids while also being capable of repairing fissures and fractures in the adjacent reservoir rock such that the efficiency of an EGS is increased and the EGS produces more power.

Moreover, in some embodiments, the calcium brine solution may have a lower freezing point than fluids typically used to fracture a well. Specifically, in some embodiments, the freezing point of the calcium brine solution may be close to 0° F. Injecting the calcium brine solution into the well at 0° F. may rapidly reduce the temperature of the well, causing contraction of the rock proximate to the well and causing the rock to further fracture due to thermal contraction.

Thus, the brine solutions described herein may be used to provide one or more of the following improvements/advantages over conventional systems: 1) simpler and easier in-situ repair of EGS wells, 2) improved heat transfer for EGS, 3) improved fracturing of rock in contact with EGS wells, and/or 4) increased operating range for EGS and fracturing fluids.

Calcium Brine Solution

The calcium brine solution is typically an aqueous solution including calcium chloride. Calcium chloride is an inorganic salt with the chemical formula $CaCl_2$. It is a white crystalline solid at room temperature, and it is highly soluble in water. Typically, the calcium brine solution includes approximately 5% to 15% by wt. calcium chloride, approximately 15% to 25% by wt. calcium chloride, and/or approximately 25% to 38% by wt. calcium chloride.

In some embodiments, the calcium brine solution is a rich calcium brine solution having an increased amount of calcium chloride, sourced from a geologic reservoir found by exploration and drilling at more than 100 feet below the surface. For example, in some embodiments, the rich calcium brine solution includes approximately 5% to 15% by wt. calcium chloride, approximately 15% to 25% by wt. calcium chloride, and/or approximately 25% to 38% by wt. calcium chloride.

In some embodiments, the calcium brine solution is a supersaturated calcium brine solution having an increased amount of calcium chloride. For example, in some embodiments, the supersaturated calcium brine solution includes approximately 30% to 40% by wt. calcium chloride, according to the historical and current temperature and pressure found at the geologic source of the brine.

As discussed in greater detail below, the calcium brine solution is used in the methods described herein to react with other injectants to repair a EGS project's well, fracture a well, and/or transfer heat to/from rock with a well. More specifically, with respect to repairing a well, the calcium brine solution is used to react with other injectants to form calcite precipitate within fissures and short circuits in the adjacent reservoir rock proximate to the brine well in need of repair. As such, in alternative embodiments, the calcium brine solution may include any calcium containing ionic or covalent compound that enables calcite to precipitate within fissures and short circuits within the well.

Additionally, as discussed in greater detail below, the calcium brine solution may be used to absorb heat from rock within the well and, as such, has a high heat capacity directly related to the Specific Gravity (S.G.) of the calcium brine solution. For example, the calcium brine solution has a S.G. of approximately 1.04 to approximately 1.13, approximately 1.13 to approximately 1.23, and approximately 1.23 to approximately 1.40 S.G.

Additionally, as discussed in greater detail below, the calcium brine solution may be chilled and used to fracture rock within the well by heat fracturing the rock. As such, the calcium brine solutions described herein have a lower freezing point that typical fracking fluids. For example, the freezing point of the calcium brine solution may be approximately 28° F. to approximately 12° F., approximately 12° F. to approximately minus 22° F., and approximately minus 22° F. to approximately minus 35° F.

In alternative embodiments, the brine solutions described herein may be any type of brine solution that enables the brine solutions to operate as described herein. For example, the calcium brine solution may include any calcium containing ionic or covalent compound that enables calcite to precipitate within fissures and short circuits within the reservoir rock proximate to the EGS well. Additionally, the brine solution may have any freezing point and/or heat capacity that enables brine solution to operate as described herein.

Liquid Carbon Dioxide

As described herein, liquid carbon dioxide ($CO_2$) is pumped into wells with the calcium brine solution to react with the calcium brine solution to precipitate calcite into the fissures and short circuits in geothermally hot reservoir rock contacted by brine fluids pumped into an EGS reservoir through at least one cold well. In order to pump the carbon dioxide into well in sufficient quantities to precipitate calcite and plug the fissures and short circuits within the well, the carbon dioxide is in liquid form. More specifically, in the illustrated embodiment, the liquid carbon dioxide has a pressure of at least 75 pounds per square inch (PSI) and a temperature below 88.0° F. (the critical point) and above −69.9° F. (the triple point).

In alternative embodiments, the liquid carbon dioxide may have any pressure and temperature that enables the methods described herein to operate as described herein. Additionally, in alternative embodiments, rather than carbon dioxide, any chemical may be injected into the well with the calcium brine solution that enables the precipitation of calcite.

pH Adjuster

As discussed in greater detail below, the calcium brine solution is used in the methods described herein to react with other injectants to repair a well, fracture a well, and/or transfer heat to/from rock with a well. A pH adjuster is used to adjust the pH of the injectants to enable the precipitation reaction to occur. Specifically, in the illustrated embodiment, the pH adjuster is a base or proton donor that adjusts the pH of the hydrated $CO_2$ and calcium chloride brine solution to become more basic. More specifically, in the illustrated embodiment, the pH adjuster includes ammonium hydroxide ($NH_4OH$. Ammonium hydroxide adjusts the pH of the injectants such that the precipitation reaction occurs fast enough to precipitate calcite and plug the fissures and short circuits within the flowpaths encountered by the treatment fluid being pumped to repair the EGS project well.

In the illustrated embodiment, the concentration of the ammonium hydroxide pH adjuster is determined by lab testing conducted as part of the planned well repair (ICIT) treatment. Additionally, in the illustrated embodiment, the pH of the injectants after the ammonium hydroxide pH adjuster has been added is approximately 7.0 to approximately 9.0.

In alternative embodiments, the pH adjuster may be any solution that adjusts the pH such that the precipitation reactions described herein proceed fast enough to precipitate calcite as described herein.

Metals or Other Reaction Inhibitors within the Calcium Brine Solution

In some embodiments, the calcium brine solution may include components that inhibit or retard the precipitation reaction described herein. For example, in some embodiments, the calcium brine solution may include copper (Cu) or zinc (Zn). The copper and/or zinc may inhibit or retard the precipitation reaction such that the reaction does not occur in sufficient precipitation speed or quantities to plug the fissures and/or short circuits within the well. As such, in order to react the injectants as described herein, the copper and/or zinc may be removed from the calcium brine solution to sufficiently low concentrations to permit the precipitation reaction to occur as designed.

Additionally, the copper and/or zinc may be used to delay, tune, or adjust the precipitation reaction such that the precipitation reaction occurs at a specific location within the well. For example, if a short circuit has been detected within an EGS at a specific location within the flow path brine follows as it exits the wellbore perforations in the EGS cold well, a predetermined amount of copper and/or zinc may be added to the calcium brine solution to inhibit or retard the precipitation reaction until the injectants have reached the short circuit. When the injectants reach the location of the short circuit within the well, the copper and/or zinc within the injectant has been reacted or otherwise used such that the precipitation reaction is allowed to proceed, and the short circuit is plugged with calcite. As such, the copper and/or zinc enables the injectants to target specific regions within the EGS wellbore and brine flow paths for repair.

In the illustrated embodiment, the calcium brine solution may include approximately 1 mg/L to approximately 5 mg/L of copper, approximately 5 mg/L to approximately 25 mg/L of copper, and/or approximately 25 mg/L to approximately 250 mg/L of copper. Additionally, the calcium brine solution may include approximately 1 mg/L to approximately 5 mg/L of zinc, approximately 5 mg/L to approximately 25 mg/L of zinc, and/or approximately 25 mg/L to approximately 250 mg/L of zinc. In alternative embodiments, the calcium brine solution may include any concentration of copper and zinc that enables the calcium brine solution to operate as described herein In alternative embodiments, the calcium brine solution may include any reaction inhibitor and/or any reaction retarding agent that enables the calcium brine solution to operate as described herein.

Method of Repairing A Well

FIG. 1 illustrates a flow diagram of a method 100 of repairing a well. As shown in FIG. 1, the method 100 includes injecting 102 a brine solution into a well. In the illustrated embodiment, the brine solution includes a calcium brine solution as described above. In some embodiments, the brine solution may include a rich brine solution as described above. In some embodiments, the brine solution may include a supersaturated brine solution as described above.

The method 100 may further include injecting 104 carbon dioxide into the well. In the illustrated embodiment, the carbon dioxide includes a liquid carbon dioxide as described above. In alternative embodiments, the carbon dioxide may include a chemical that includes carbon dioxide that disassociates from the chemical to react with the brine solution as described herein.

The method 100 may further include reacting 106 the brine solution with the carbon dioxide to form calcite such that calcite precipitates into the well and repairs fissures or short circuits within the well. Specifically, as shown in EQNS. 1 and 2 below, the brine solution is reacted with the carbon dioxide to form calcite.

$$CO_2 + H2O \leftrightarrow H_2CO_3 \qquad \text{EQN. 1}$$

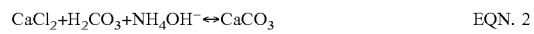

$$CaCl_2 + H_2CO_3 + NH_4OH^- \leftrightarrow CaCO_3 \qquad \text{EQN. 2}$$

As shown in EQNS. 1 and 2, carbon dioxide forms carbonic acid which is reacted with calcium chloride and ammonium hydroxide to form calcite. The calcite precipitates into a solid within the fissure or short circuit to plug the fissure or short circuit and re-direct subsequent injected brine process fluid to hotter areas of the EGS reservoir.

The method 100 may further include injecting 108 a pH adjuster into the well with the brine solution and the carbon dioxide. In the illustrated embodiment, the pH adjuster includes a basic solution. Specifically, in the illustrated embodiment, the pH adjuster includes ammonium hydroxide as described above. The pH adjuster is configured to adjust the pH of the brine solution and the carbon dioxide such that calcite is precipitated within the fissure or fracture that contributed to a flow path short circuit between the cold well and the hot well in EGS. More specifically, as described above, the pH adjuster adjusts the pH of the injectants to approximately 7.0 to approximately 9.0.

The method 100 may further include adjusting 110 a concentration of a reaction inhibitor within the brine solution. Specifically, the concentration of the reaction inhibitor may be reduced or increased to a concentration that delays the precipitation reaction described herein. Additionally, the concentration of the reaction inhibitor may be reduced to a concentration that permits the precipitation reaction to occur uninhibited described herein. The presence of metal ions in fairly low concentrations (typically <500 ppm) can inhibit the carbonate mineral precipitation process. In EGS well intervention treatments, the metal ions may be selectively removed to less than approximately 10 ppm, prior to pumping the brine solution, thereby increasing the speed and efficiency of the calcium carbonate precipitation process. This provides an on-site treatment lever that provides unique control over the level of flow re-direction from existing flow paths to new or less effective flow paths within the EGS reservoir. In this process, the earth's heat capacity is "mined efficiently" by the brine process fluid using ICIT conformance technology as described herein.

The method 100 may further include removing 112 the precipitated calcite in using an acidic solution. More specifically, if the flow path intervention material, specifically the calcite precipitated in the formation fractures, is to be removed in all or part, an acidizing treatment may be used. This type of remedial acidizing treatment has been used to remove calcite scale and similar limestone and dolomite minerals from oil and gas reservoirs. Therefore, the risk of completely "sealing off" a flow path from injector to producer is mitigated and manageable.

Method 100 includes direct, in-situ flow path intervention placed via EGS injector (cold) wellbore which alters hydraulic flow and thermal fluid properties at the complimentary EGS producer (hot) wellbore. A specified thru-wellbore treatment which uses industrial grade fluids including Calcium Chloride Brine, Liquid Carbon Dioxide, and various pH-swing process reagents is pumped through the injection well's completed zone(s) into the flow paths that are short circuited and not providing the level of heat transfer required for the EGS project.

During some oil and gas well drilling and completion projects at borehole temperatures under 275° F., the use of a stable brine solution with similar physical and chemical properties is an accepted and proven method of controlling abnormally high well pressures and mitigating clay swelling and salt zone erosion when drilling and completion fluids contact certain susceptible formations. Polymer additives are often used in these situations; however, they have no applicability above 275° F. as they degrade and lose the viscosity-building properties they are designed to provide and hence are not applicable for use in EGS drilling and completion projects. This same viscosity degradation is common for all common fracturing (frac) fluids that contain linear gels or crosslinked gel systems as their base fluids. These gelled fluids typically have a S. G. of 8.34-9.0 prior to the addition of proppant. This loss of viscosity and proppant carrying capacity can preclude these gel systems for EGS well completions which are not thermally constrained by costly wellbore cooldown processes. The only viable EGS multi-stage deep stimulation alternative is to use essentially a clean water with near drinking water levels of minerals for the base drilling and fracturing fluid systems. Proppant loads for these clean frac fluid systems would typically be much lower than one using a brine solution for the base fluid because of the ability of this higher S. G. fluid to carry the additional mass of proppant load without the consequences of well bore and/or near wellbore screen-out.

The method 100 improves flow path efficiency in EGS reservoir systems and the reagents are introduced as a separate, planned and monitored "treatment" aimed to redirect fluid flow in-situ to eliminate or correct "short circuits" in the EGS reservoir that are not allowing efficient heat transfer to occur. Post treatment, certain reagents can be placed via injection into the wellbore to help ensure that a long-lasting Calcium Carbonate mineralization deposit is retained in the EGS reservoir over the life of the project.

EGS requires the ability to control the flow of fluids through and throughout the created reservoir. Conventional approaches for altering flow through a reservoir are borehole centric where flow control into or out of a well is centrally managed from the wellbore. Aspects of the technology and techniques set out herein can be used to control flow regimes outside of the wellbore and within the reservoir and to mitigate undesirable flow and heat transfer rates that degrade the performance of EGS reservoirs.

Method for Preparing A Brine Solution

Figure 2:
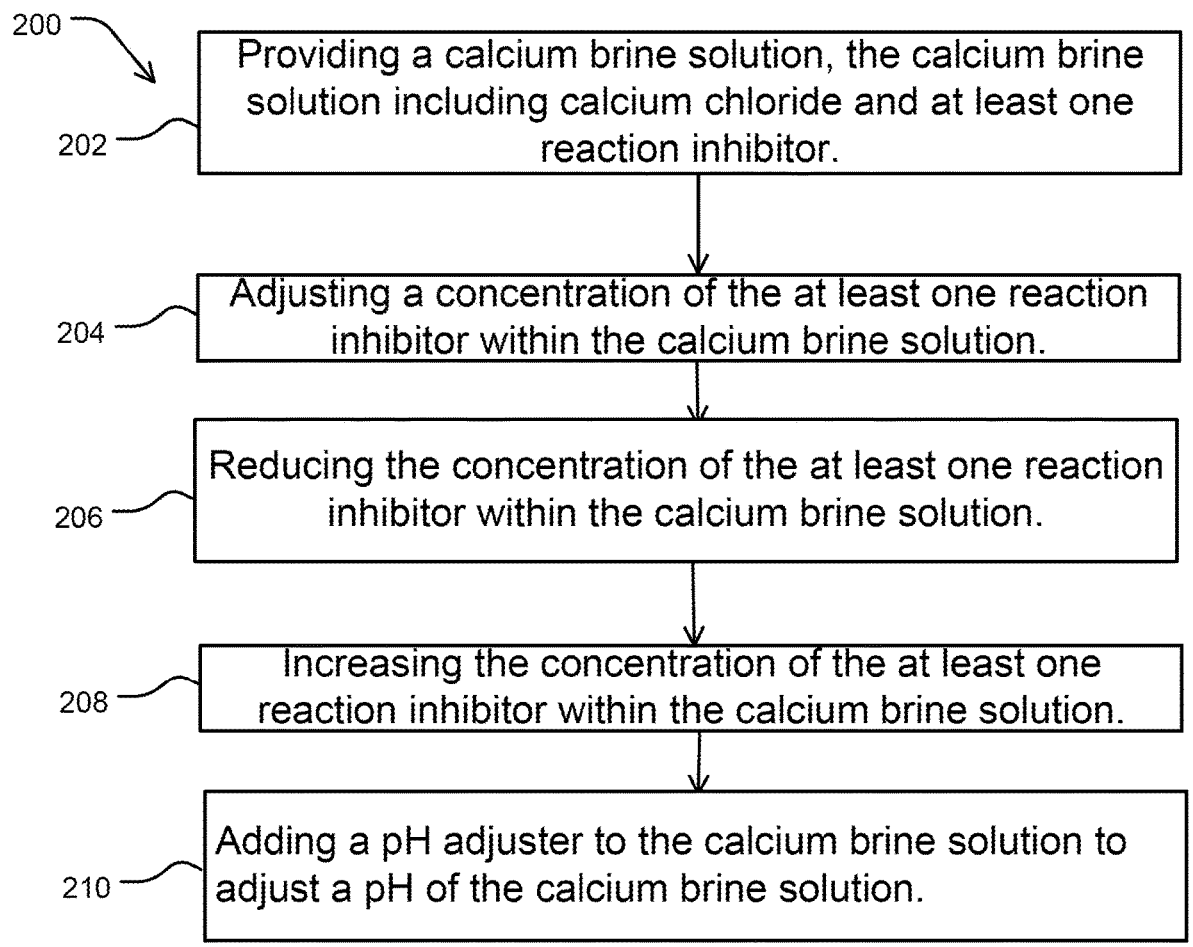
FIG. 2 illustrates a flow diagram of a method of preparing a brine solution in accordance with aspects of the present disclosure.

FIG. 2 illustrates a flow diagram of a method 200 of preparing a brine solution. As shown in FIG. 2, the method 200 includes providing 202 a brine solution. In the illustrated embodiment, the brine solution includes a calcium brine solution as described above. In some embodiments, the brine solution may include a rich brine solution as described above. In some embodiments, the brine solution may include a supersaturated brine solution as described above.

In the illustrated embodiment, the brine solution may include additional reaction inhibitors or retarding agents that inhibit or slow the precipitation reaction. As described above, the reaction inhibitors or retarding agents may include metal ions including copper and zinc. In order to enable the precipitation reaction to occur as described herein, the method 200 may further include adjusting 204 a concentration the reaction inhibitors or retarding agents within the brine solution. More specifically, in some embodiments, adjusting 204 a concentration the reaction inhibitors or retarding agents within the brine solution may include reducing 206 the concentration of the reaction inhibitors or retarding agents within the brine solution. In alternative embodiments, adjusting 204 a concentration the reaction inhibitors or retarding agents within the brine solution may include increasing 208 the concentration the reaction inhibitors or retarding agents within the brine solution.

The method 200 may further include adding 210 a pH adjuster to the brine solution to adjust a pH of the brine solution. The pH adjuster is configured to adjust the pH of the brine solution such that calcite is precipitated within the fissure or short circuit of the well. More specifically, as described above, the pH adjuster adjusts the pH of the brine solution to approximately 7.0 to approximately 9.0.

The brine solution is a stable, saturated, subsurface-sourced brine solution that enables the continual EGS process cycling of the brine solution without loss (or addition through solubility) of minerals to the reservoir with changes in temperature during the injection, production, and reinjection circular process. The brine solution typically has a low pH, such as 1.5-5. This lower pH is mildly acidic thereby reducing the chance of plugging of established and created flow paths that are desirable for thermal heat recovery.

Method for Removing Heat From Rock Within A Well Using A Brine Solution for EGS

The brine solution may be used as the actual process fluid for the heat exchange and continuous reinjection for re-heating process in an EGS system, either open-loop or closed loop. The thermal properties of a stable, saturated brine solution provides superior mass heat exchange both at the surface during conventional binary cycle power generation (steam turbine) and downhole in the heat transfer process where the process fluid thermal contact with the hot reservoir rock is critical to the overall heat exchange and electric power efficiency rating for a given EGS project. The physical and chemical properties of the brine solution that is utilized during the drilling, completion, and remedial flow path correction phases of an EGS project are unique and have important value to the overall efficiency and success of an EGS project. The specific gravity of brines which can range from 1.04 S.G. to 2.0 S.G. due to TDS or dissolved minerals load is important due to the increased thermal capacity per unit of volume, and the ability of the brine to carry additional mass and inertia as it is pumped into a wellbore during drilling, completion, and remedial well intervention phases over the life of an EGS project.

Figure 3:
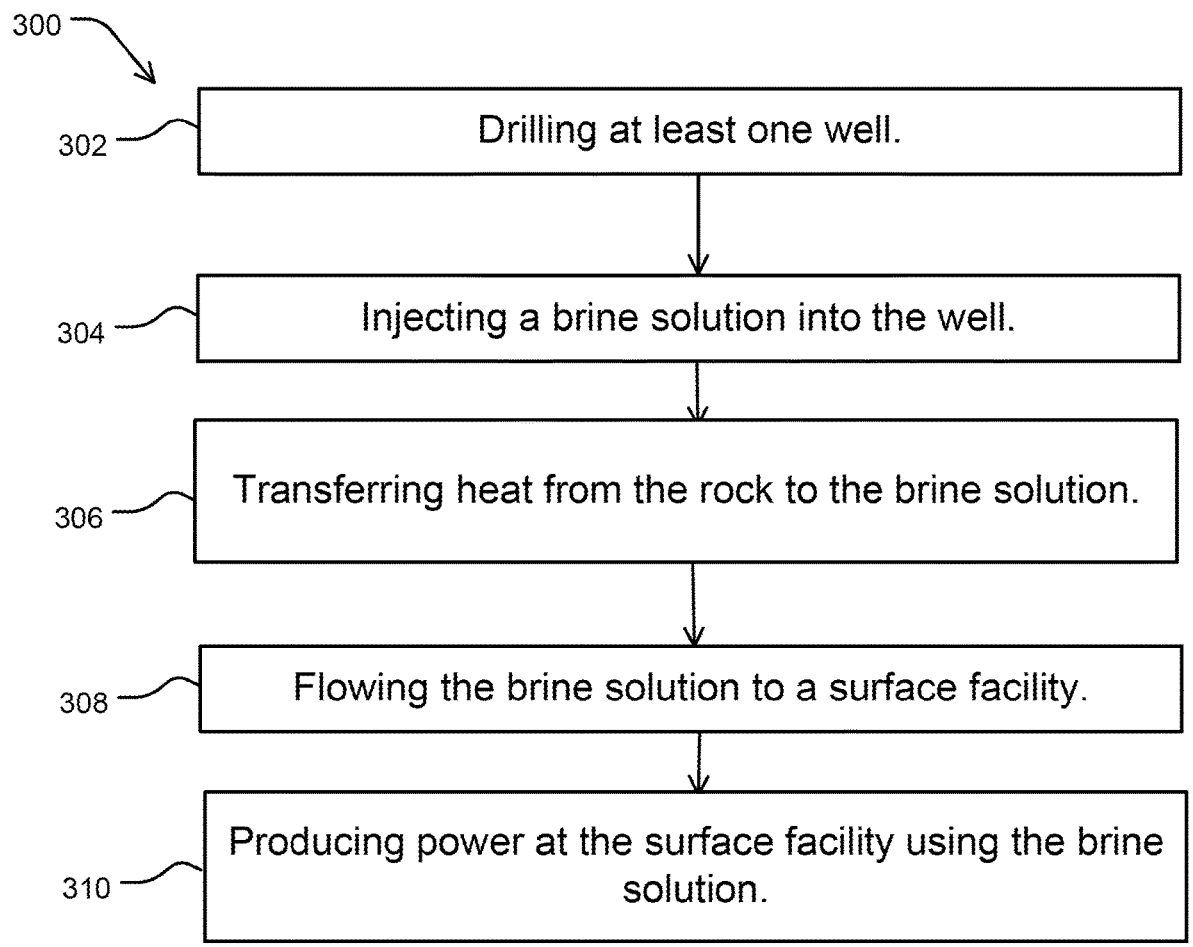
FIG. 3 illustrates a flow diagram of a method of removing heat from rock within a well using an EGS in accordance with aspects of the present disclosure.

FIG. 3 illustrates a flow diagram of a method 300 of removing heat from rock within a well using an EGS. The method 300 includes drilling 302 at least one well for the EGS. The method 300 further includes injecting 304 a brine solution into the well. In the illustrated embodiment, the brine solution includes a calcium brine solution as described above. In some embodiments, the brine solution may include a rich brine solution as described above. In some embodiments, the brine solution may include a supersaturated brine solution as described above. The method 300 also includes transferring heat 306 from the rock to the brine solution. The method 300 may further include flowing 308 the brine solution to a surface facility. The method 300 may also include producing power 310 at the surface facility using the brine solution. Producing power 310 at the surface facility using the brine solution may include producing power using a turbine and the brine solution.

Method of Fracturing a Well

The brine solution may be super-cooled to well below the 32° F. freeze point of typical water based drilling and fracturing fluid. A calcium brine solution has a concentration of 38% by wt. calcium chloride and has a freeze point of approximately minus 35° F. As such, the costs of heating fracturing fluids on the surface using propane or natural gas fired "hot oilers" are eliminated in Northern Climates during the colder months. In Hot Dry Rock (HDR) EGS projects, simply pre-chilling the calcium chloride brine fracturing fluid and circulating the wellbore to "cool down" the near wellbore region can provide novel means of ensuring that any number of wireline conveyed electronic instruments that are unreliable at temperatures above 275° F. can function and survive the trip in and out of the wellbore.

Additionally, the brine solution may be super-cooled and injected into the well to further fracture the reservoir rock in contact with the super-cooled injected fluids injected in the wellbore as part of the completion process. More specifically, because the calcium brine solution has a freezing point below the freezing point of water, the calcium brine solution may be injected into the well at temperatures that are below the lower operating temperatures of most fracturing fluids. The super-cooled brine solution thermally contacts the rock within the well, substantially cooling and thermally contracting the rock. The thermal contractions cause the rock to fracture rock in contact with the well.

Figure 4:
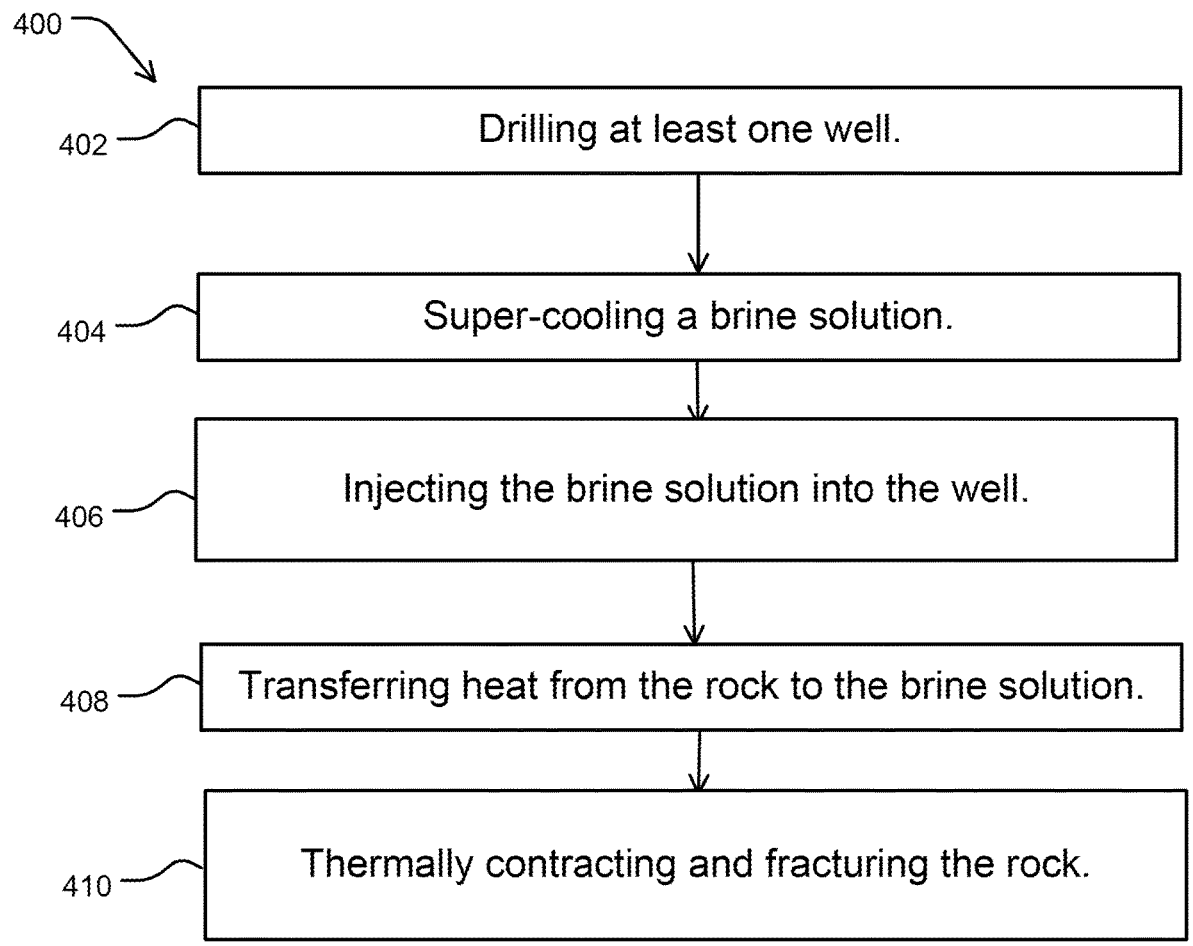
FIG. 4 illustrates a flow diagram of a method of fracturing a well in accordance with aspects of the present disclosure.

FIG. 4 illustrates a flow diagram of a method 400 of fracturing a well. The method 400 includes drilling 402 at least one well. The method 400 also includes super-cooling 404 a brine solution. The method 400 further includes injecting 406 the brine solution into the well. In the illustrated embodiment, the brine solution includes a calcium brine solution as described above. In some embodiments, the brine solution may include a rich brine solution as described above. In some embodiments, the brine solution may include a supersaturated brine solution as described above. The method 400 also includes transferring heat 408 from the rock to the brine solution. The method 400 further includes thermally contracting and fracturing 410 the rock.

A number of embodiments of a method of repairing a well, a method for preparing a brine solution, a method for removing heat from rock within a well using a brine solution for EGS, and a method of fracturing a well are presented in this application. In general, each of the methods described herein use a brine solution to repair a well, absorb heat from a well, and/or fracture the rock around a well. Specifically, in the illustrated embodiments, the brine solution includes a calcium brine solution. More specifically, in the illustrated embodiments, the brine solution includes a calcium rich brine solution. The calcium brine solution has several unique properties that enable the solution to repair and/or fracture wells and absorb heat from the rock within a well.

Specifically, in some embodiments, the calcium brine solution may be injected into the well with liquid carbon dioxide ($CO_2$) and pH adjuster such that the calcium brine solution, the liquid carbon dioxide, and the pH adjuster react to precipitate calcite ($CaCO_3$) on the walls of the well. The calcite precipitates into undesired fissures or short circuits in the well and plugs the undesired fissures or short circuits in the well. As such, the calcium brine solution may be used to repair wells and insure that the wells are in compliance with all applicable regulations.

Additionally, in some embodiments, the calcium brine solution may have a high heat capacity and may be capable of absorbing large amounts of heat. As such, the calcium brine solutions described herein may be capable of absorbing greater amounts of heat than current EGS fluids while also being capable of repairing fissures and fractures in the reservoir contacted by process fluids injected into the cold well such that the efficiency of an EGS is increased and the EGS produces more power.

Moreover, in some embodiments, the calcium brine solution may have a lower freezing point than fluids typically used to fracture a well. Specifically, in some embodiments, the freezing point of the calcium brine solution may be close to 0° F. Injecting the calcium brine solution into the well at 0° F. may rapidly reduce the temperature of the well, causing contraction of the rock within the well and causing the rock to further fracture due to the contraction.

Thus, the brine solutions described herein may be used to provide one or more of the following improvements/advantages over conventional systems: 1) simpler and easier in-situ repair of wells, 2) improved heat transfer for EGS, 3) improved fracturing of rock within wells, and/or 4) increased operating range for EGS and fracking fluids.

Terminology and Interpretative Conventions

Any methods described in the claims or specification should not be interpreted to require the steps to be performed in a specific order unless stated otherwise. Also, the methods should be interpreted to provide support to perform the recited steps in any order unless stated otherwise.

Spatial or directional terms, such as "left," "right," "front," "back," and the like, relate to the subject matter as it is shown in the drawings. However, it is to be understood that the described subject matter may assume various alternative orientations and, accordingly, such terms are not to be considered as limiting.

Articles such as "the," "a," and "an" can connote the singular or plural. Also, the word "or" when used without a preceding "either" (or other similar language indicating that "or" is unequivocally meant to be exclusive—e.g., only one of x or y, etc.) shall be interpreted to be inclusive (e.g., "x or y" means one or both x or y).

The term "and/or" shall also be interpreted to be inclusive (e.g., "x and/or y" means one or both x or y). In situations where "and/or" or "or" are used as a conjunction for a group of three or more items, the group should be interpreted to include one item alone, all the items together, or any combination or number of the items.

The terms have, having, include, and including should be interpreted to be synonymous with the terms comprise and comprising. The use of these terms should also be understood as disclosing and providing support for narrower alternative embodiments where these terms are replaced by "consisting" or "consisting essentially of."

Unless otherwise indicated, all numbers or expressions, such as those expressing dimensions, physical characteristics, and the like, used in the specification (other than the claims) are understood to be modified in all instances by the term "approximately." At the very least, and not as an attempt to limit the application of the doctrine of equivalents to the claims, each numerical parameter recited in the specification or claims which is modified by the term "approximately" should be construed in light of the number of recited significant digits and by applying ordinary rounding techniques.

All disclosed ranges are to be understood to encompass and provide support for claims that recite any and all subranges or any and all individual values subsumed by each range. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

All disclosed numerical values are to be understood as being variable from 0-100% in either direction and thus provide support for claims that recite such values or any and all ranges or subranges that can be formed by such values. For example, a stated numerical value of 8 should be understood to vary from 0 to 16 (100% in either direction) and provide support for claims that recite the range itself (e.g., 0 to 16), any subrange within the range (e.g., 2 to 12.5) or any individual value within that range (e.g., 15.2).

The terms recited in the claims should be given their ordinary and customary meaning as determined by reference to relevant entries in widely used general dictionaries and/or relevant technical dictionaries, commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used in a manner that is more expansive than its ordinary and customary meaning, the term should be given its ordinary and customary meaning plus the additional expansive meaning, or (b) if a term has been explicitly defined to have a different meaning by reciting the term followed by the phrase "as used in this document shall mean" or similar language (e.g., "this term means," "this term is defined as," "for the purposes of this disclosure this term shall mean," etc.). References to specific examples, use of "i.e.," use of the word "invention," etc., are not meant to invoke exception (b) or otherwise restrict the scope of the recited claim terms. Other than situations where exception (b) applies, nothing contained in this document should be considered a disclaimer or disavowal of claim scope.

The subject matter recited in the claims is not coextensive with and should not be interpreted to be coextensive with any embodiment, feature, or combination of features described or illustrated in this document. This is true even if only a single embodiment of the feature or combination of features is illustrated and described in this document.

INCORPORATION BY REFERENCE

The entire content of each of the documents listed below are incorporated by reference into this document. If the same term is used in both this document and one or more of the incorporated documents, then it should be interpreted to have the broadest meaning imparted by any one or combination of these sources unless the term has been explicitly defined to have a different meaning in this document. If there is an inconsistency between any of the following documents and this document, then this document shall govern. The incorporated subject matter should not be used to limit or narrow the scope of the explicitly recited or depicted subject matter. —U.S. Prov. App. No. 63/229,402, titled "Apparatus and Method for Engineered Geothermal System in-Situ Conformance Improvement Treatment using Brines Infused with CO2 (In-Situ Conformance Improvement Treatment (ICIT))," filed on Aug. 4, 2022.

What is claimed:

1. A method of repairing a well, the method comprising:
   injecting a brine solution into the well;
   injecting carbon dioxide into the well; and
   reacting the brine solution with the carbon dioxide to form calcite such that calcite precipitates into the well and repairs fissures or short circuits within the well.

2. The method of claim 1, further comprising injecting a pH adjuster into the well with the brine solution and the carbon dioxide.

3. The method of claim 1, further comprising adjusting a concentration of a reaction inhibitor within the brine solution.

4. The method of claim 1, further comprising removing the precipitated calcite in using an acidic solution.

5. The method of claim 1, wherein the brine solution comprises a calcium brine solution.

6. The method of claim 1, wherein the brine solution comprises a rich calcium brine solution.

7. The method of claim 1, wherein the brine solution comprises a supersaturated calcium brine solution.

8. The method of claim 1, further comprising:
   providing a calcium brine solution, the calcium brine solution comprising calcium chloride and at least one reaction inhibitor; and
   adjusting a concentration of at least one reaction inhibitor within the calcium brine solution.

9. The method of claim 8, wherein adjusting a concentration of at least one reaction inhibitor within the calcium brine solution comprises reducing the concentration of at least one reaction inhibitor within the calcium brine solution.

10. The method of claim 8, wherein adjusting a concentration of at least one reaction inhibitor within the calcium brine solution comprises increasing the concentration of at least one reaction inhibitor within the calcium brine solution.

11. The method of claim 8, further comprising adding a pH adjuster to the calcium brine solution to adjust a pH of the calcium brine solution.

\* \* \* \* \*